US011879346B2

(12) United States Patent
Kunte et al.

(10) Patent No.: US 11,879,346 B2
(45) Date of Patent: Jan. 23, 2024

(54) METHOD FOR UPGRADING A GAS TURBINE AND GAS TURBINE

(71) Applicant: Siemens Energy Global GmbH & Co. KG, Bayern (DE)

(72) Inventors: Harald Kunte, Dusseldorf (DE); Robert Kunte, Düsseldorf (DE); Karen Lee, Charlotte, NC (US); Michael Wagner, Dinslaken (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/629,375

(22) PCT Filed: Jun. 29, 2020

(86) PCT No.: PCT/EP2020/068226
§ 371 (c)(1),
(2) Date: Jan. 22, 2022

(87) PCT Pub. No.: WO2021/018495
PCT Pub. Date: Feb. 4, 2021

(65) Prior Publication Data

US 2022/0268172 A1 Aug. 25, 2022

(30) Foreign Application Priority Data

Jul. 31, 2019 (DE) ..................... 10 2019 211 418.0

(51) Int. Cl.
*F01D 25/12* (2006.01)
*F01D 5/18* (2006.01)
*F01D 9/04* (2006.01)

(52) U.S. Cl.
CPC ............ *F01D 25/12* (2013.01); *F01D 5/186* (2013.01); *F01D 9/041* (2013.01);
(Continued)

(58) Field of Classification Search
CPC ............ F05D 2230/80; F05D 2240/15; F05D 2240/81; F05D 2240/121; F01D 9/023
See application file for complete search history.

(56) References Cited

U.S. PATENT DOCUMENTS 6,082,961 A * 7/2000 Anderson ................ F01D 9/04 415/176
6,154,959 A 12/2000 Goodwater et al.
(Continued)

FOREIGN PATENT DOCUMENTS

EP 0902164 A1 3/1999
EP 2754858 A1 7/2014
(Continued)

OTHER PUBLICATIONS

PCT International Search Report and Written Opinion of International Searching Authority dated Oct. 2, 2020 corresponding to PCT International Application No. PCT/EP2020/068226 filed Jun. 29, 2020.

*Primary Examiner* — Courtney D Heinle
*Assistant Examiner* — Danielle M. Christensen
(74) *Attorney, Agent, or Firm* — Wolter Van Dyke Davis, PLLC

(57) ABSTRACT

A method for upgrading a gas turbine, the method includes: a) removing all guide vanes of the first guide vane stage; b) replacing the removed guide vanes of the first guide vane stage with new or reconditioned guide vanes, wherein blade platforms of the new or reconditioned guide vanes are provided with cooling air bores which fluidically connect a cooling air supply duct to the annular gap and open into the annular gap, and wherein the cooling air bores are arranged in such a manner that more cooling air bores open into regions of an annular gap that are arranged radially inwards from leading edges of the guide vanes than in other regions of the annular gap.

7 Claims, 6 Drawing Sheets

(52) U.S. Cl.
CPC .... *F05D 2230/80* (2013.01); *F05D 2240/121* (2013.01); *F05D 2240/15* (2013.01); *F05D 2240/81* (2013.01); *F05D 2260/202* (2013.01)

(56) References Cited

U.S. PATENT DOCUMENTS

| | | | | |
|---|---|---|---|---|
| 7,775,050 | B2 * | 8/2010 | Patterson | F01D 9/023 60/800 |
| 8,118,554 | B1 * | 2/2012 | Liang | F01D 9/041 416/97 R |
| 8,973,374 | B2 * | 3/2015 | Sharma | F01D 5/142 415/199.5 |
| 10,252,790 | B2 * | 4/2019 | Ramakrishnan | F02K 3/062 |
| 10,738,629 | B2 * | 8/2020 | Granberg | F01D 5/186 |
| 10,801,352 | B2 * | 10/2020 | Wagner | F01D 11/122 |
| 2018/0195400 | A1 | 7/2018 | Granberg et al. | |
| 2020/0131993 | A1 * | 4/2020 | Giesel | F01D 25/285 |

FOREIGN PATENT DOCUMENTS

| | | | |
|---|---|---|---|
| JP | H07217404 | A | 8/1995 |
| WO | 2009083456 | A2 | 7/2009 |
| WO | 2013127833 | A1 | 9/2013 |

* cited by examiner

METHOD FOR UPGRADING A GAS TURBINE AND GAS TURBINE

CROSS REFERENCE TO RELATED APPLICATIONS

This application is the U.S. National Stage of International Application No. PCT/EP2020/068226 filed 29 Jun. 2020, and claims the benefit thereof. The International Application claims the benefit of German Application No. DE 10 2019 211 418.0 filed 31 Jul. 2019. All of the applications are incorporated by reference herein in their entirety.

FIELD OF INVENTION

The present invention relates to a method for upgrading a gas turbine. The invention furthermore relates to a gas turbine.

BACKGROUND OF INVENTION

Gas turbines are known in a wide variety of configurations in the prior art. They comprise a combustion chamber, which is lined with heat-shielding elements, and a gas turbine which is arranged downstream of the combustion chamber and comprises guide vanes and moving vanes. Said heat-shielding elements, which are held on the outer side of a positionally fixed annular supporting structure directly upstream of the gas turbine in the downward flow direction, and vane platforms of the guide vanes of a first guide vane stage, which vane platforms are held on a positionally fixed supporting structure, define between them, because of the design, a radially inner and a radially outer annular gap. Cooling air is introduced into said annular gaps via cooling-air supply ducts, which supply the guide vanes of the first guide vane stage with cooling air, in order to prevent overheating in particular of the supporting structure, and the supporting structure and the regions of said vane platforms that face the annular gap. The cooling air is introduced into the annular gap generally in the axial direction via cooling-air openings which are formed on the end sides of the heat-shielding elements and are distributed uniformly over the circumference of the annular gap. In other words, the cooling air which is used for cooling the heat-shielding elements is additionally also used for cooling the annular gap.

It has turned out that, during the operation of such a gas turbine, inhomogeneous pressure fields are formed in the region of the annular gaps and are primarily caused by the fact that the hot gas flowing out of the combustion chamber into the gas turbine accumulates in the region of the leading edges of the blades of the guide vanes of the first guide vane stage. In the region of the leading edges, said inhomogeneous pressure fields have pressure maxima which lead to the hot gas penetrating the annular gaps in the region of the leading edges. Against this background, it is furthermore known to provide the supporting structure with cooling-air ducts which in each case fluidically connect a cooling-air supply duct to one of the annular gaps and open into the corresponding annular gap radially inward from the leading edges of the guide vanes of the first guide vane stage. The cooling air which is conducted through said cooling air ducts therefore enters the corresponding annular gap in each case in the region of the pressure maxima and generates cooling-air flows which prevent hot air from penetrating the annular gap in the region of the pressure maxima or in the region of the leading edges of the guide vanes.

SUMMARY OF INVENTION

Starting from this prior art, it is an object of the present invention to provide a gas turbine with an alternative design.

In order to achieve this object, the present invention provides a method for upgrading a gas turbine which has a combustion chamber, which is lined with heat-shielding elements, and a gas turbine which is arranged downstream of the combustion chamber and comprises guide vanes and moving vanes, wherein said heat-shielding elements, which are held on the outer side of a positionally fixed supporting structure directly upstream of the gas turbine in the downward flow direction, and vane platforms of the guide vanes of a first guide vane stage, which vane platforms are held on a positionally fixed supporting structure, define annular gaps between them, wherein the method comprises the steps of:

a) removing all the guide vanes of the first guide vane stage;

b) replacing the removed guide vanes of the first guide vane stage with new or reconditioned guide vanes, wherein platforms of the new or reconditioned guide vanes are provided with cooling-air bores which fluidically connect a cooling-air supply duct, which supplies the guide vanes of the first guide vane stage with cooling air, to one of the annular gaps and open into the corresponding annular gap, and wherein the cooling-air bores are arranged in such a manner that more cooling-air bores open into regions of the annular gap or of the annular gaps that are arranged in the radial direction in the region of leading edges of the guide vanes than into other regions of the annular gap or of the annular gaps.

If the upgrading method according to the invention is used in gas turbines which still do not have any additional cooling in sections of the annular gaps in the region of the leading edges of the guide vanes of the first guide vane stage or of the pressure maxima caused by them, there is a particular advantage to the effect that, in order to produce the cooling-air bores, no machining work has to be carried out in situ or on components which are difficult to remove, such as in particular on the supporting structure, thus preventing unnecessary contamination of the gas turbine while the upgrading method is being carried out. On the contrary, owing to the fact that the cooling-air bores are provided on one or on both vane platforms of the guide vanes concerned, said cooling-air bores can be produced away from the gas turbine during the production of new guide vanes or during the reconditioning of old guide vanes.

If the method according to the invention is carried out on a gas turbine which is to be modernized and which already has cooling-air ducts which extend through the supporting structure, in each case fluidically connect one of the cooling-air supply ducts to one of the annular gaps and open into the corresponding annular gap, and if the number of new or reconditioned guide vanes does not correspond to the number of removed guide vanes, the cooling-air ducts extending through the supporting structure are advantageously at least partially closed after step a) is carried out and before step b) is carried out, with in particular all the cooling-air ducts being closed. In cases in which the number of guide vanes of the first guide vane stage is intended to be changed, in particular reduced, within the scope of upgrading work, the positions of the cooling-air outlet openings of the cooling ducts formed in the supporting structure no longer coincides with the positions of the pressure maxima, and therefore it is no longer possible to reliably prevent hot gas from penetrating the annular gaps in the region of the leading edges of the guide vanes. Instead of producing new cooling ducts at the corresponding positions in the supporting structure, the present invention proposes replacing the cooling, that was previously brought about by said cooling ducts, at least partially, advantageously completely by cooling via the cooling-air bores of the new guide vanes mounted in step b). This likewise affords the advantage that machining operations in situ or on components of the gas turbine that are difficult to remove are avoided.

The cooling-air bores formed in vane platforms of the new or reconditioned guide vanes advantageously define cooling-air-bore groups which are arranged circumferentially at a distance from one another, which leads to a simplification of the production of the guide vanes.

According to one refinement of the present invention, radially facing surfaces of the vane platforms of the guide vanes removed in step a) are provided with film-cooling holes which, in the installed state of the guide vanes, are fluidically connected to one of the cooling-air supply ducts, and radially facing surfaces of the vane platforms of the new guide vanes installed in step b) are provided with film-cooling holes which, in the installed state of the guide vanes, are fluidically connected to one of the cooling-air supply ducts, wherein the number of film-cooling holes of the new or reconditioned guide vanes is smaller than the number of film-cooling holes of the guide vanes removed in step a). The cooling-air mass flow that is saved by reducing the number of film-cooling holes can then be entirely or partially conducted through the cooling-air bores formed in the vane platforms of the new or reconditioned guide vanes.

Baffle plates which are provided with through holes are advantageously arranged on vane platforms of the new or reconditioned guide vanes, said baffle plates being designed and arranged in such a manner that the cooling air coming from the corresponding cooling-air supply duct has to pass through them in order to reach the film-cooling holes. With baffle plates of this type, improved cooling is achieved.

According to one refinement of the present invention, each of the baffle plates is designed and arranged in such a manner that an intermediate space remains between it and the film-cooling holes.

Advantageously, some of the cooling-air bores formed in the vane platforms of the new or reconditioned guide vanes are arranged in such a manner that they open into the intermediate space.

The present invention furthermore provides a gas turbine which has a combustion chamber, which is lined with heat-shielding elements, and a gas turbine which is arranged downstream of the combustion chamber and comprises guide vanes and moving vanes, wherein said heat-shielding elements, which are held on the outer side of a positionally fixed supporting structure directly upstream of the gas turbine in the downward flow direction, and vane platforms of the guide vanes of a first guide vane stage, which vane platforms are held on a positionally fixed supporting structure, define annular gaps between them, wherein vane platforms of the guide vanes are provided with cooling-air bores which each fluidically connect a cooling-air supply duct, which supplies the guide vanes of the first guide vane stage with cooling air, to one of the annular gaps and open into the corresponding annular gap.

Advantageously, more cooling-air bores open into regions of an annular gap that are arranged radially inward from the leading edges of the guide vanes than into other regions of the annular gap.

Advantageously, the cooling-air bores formed in the vane platforms of the guide vanes of the first guide vane stage define cooling-air-bore groups which are arranged circumferentially at a distance from one another.

According to one refinement of the present invention, the cooling-air bores of each cooling-air-bore group are positioned identically.

Radially facing surfaces of the vane platforms of the guide vanes of the first guide vane stage are advantageously provided with film-cooling holes which, in the installed state of the guide vanes, are fluidically connected to one of the cooling-air supply ducts.

Baffle plates which are provided with through holes are advantageously arranged on the vane platforms of the guide vanes of the first guide vane stage, said baffle plates being designed and arranged in such a manner that the cooling air coming from one of the cooling-air supply ducts has to pass through them in order to reach the film-cooling holes.

Each of the baffle plates is advantageously designed and arranged in such a manner that there is an intermediate space between it and the film-cooling holes.

Advantageously, some of the cooling-air bores are arranged in such a manner that some of the cooling-air bores open into the intermediate space.

BRIEF DESCRIPTION OF THE DRAWINGS

Further features and advantages of the present invention will become clear using the description below of a method according to an embodiment of the present invention with reference to the attached drawing, in which.

DETAILED DESCRIPTION OF INVENTION

Figure 1:
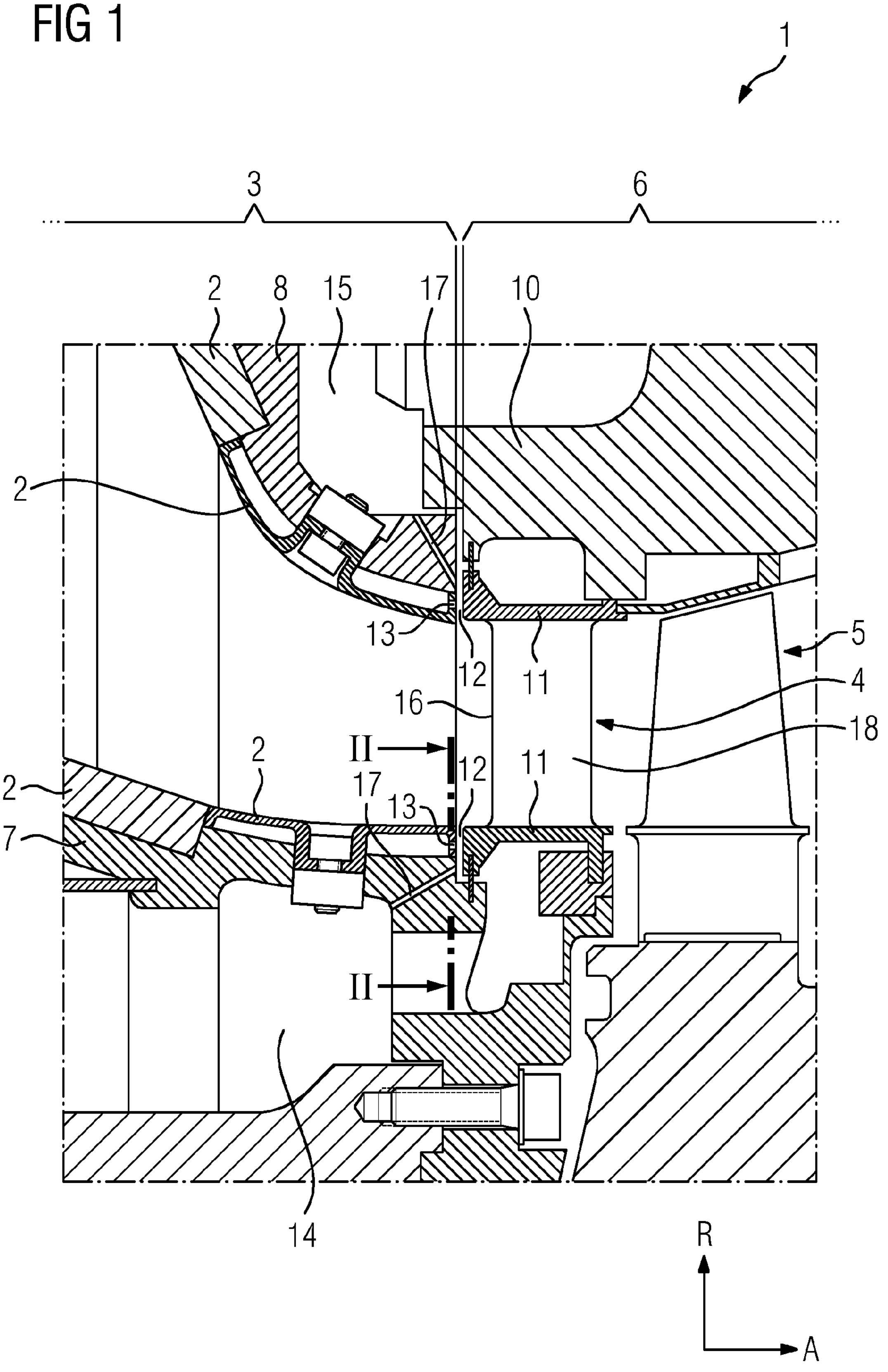
FIG. 1 shows a schematic sectional view of a partial region of a gas turbine.
Figure 2:
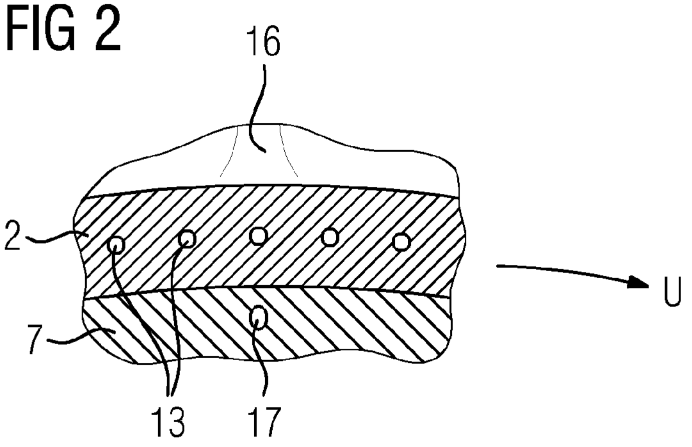
FIG. 2 shows a partial view in the direction of the arrows II in FIG. 1.
Figure 3:
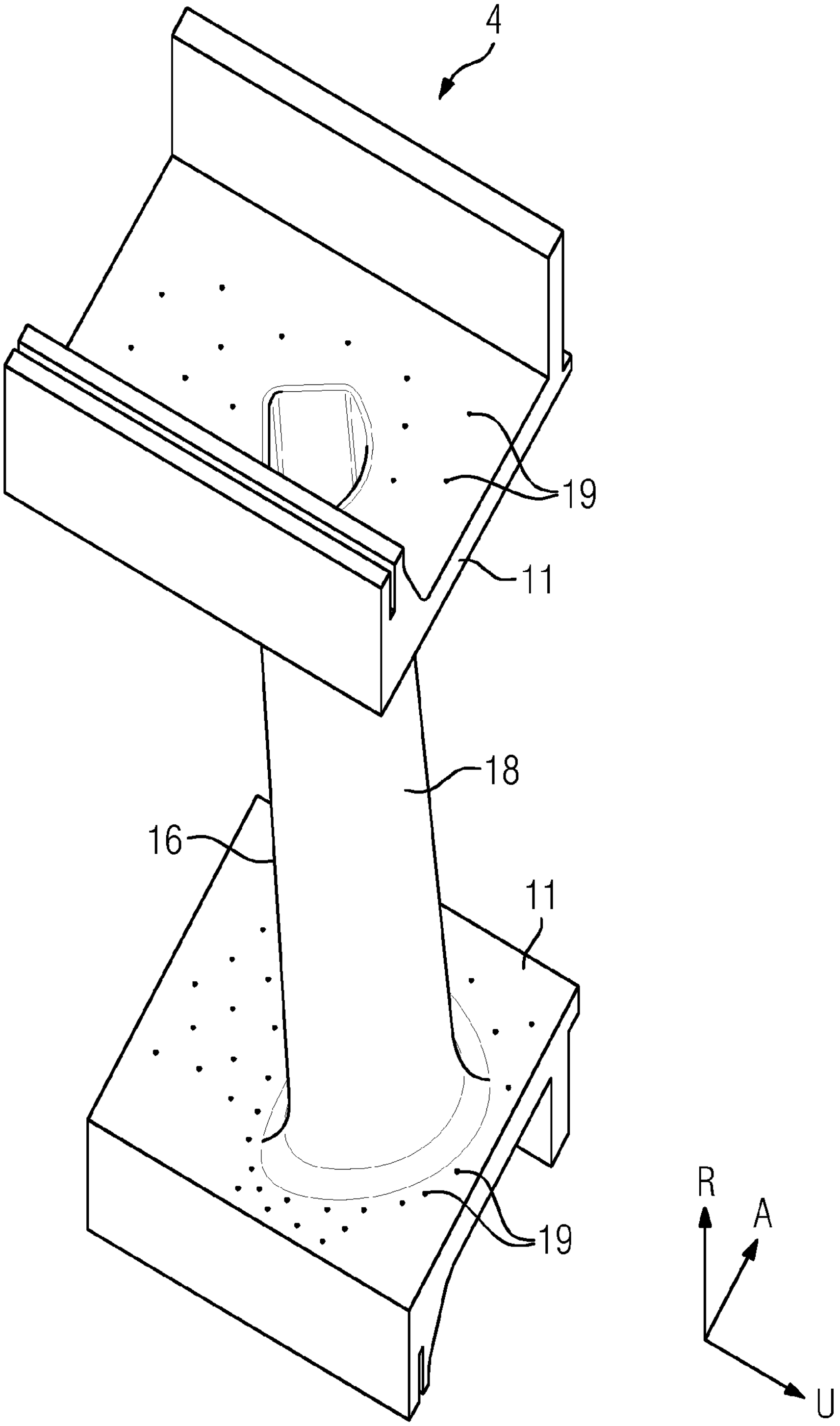
FIG. 3 shows a perspective view of a guide vane of a first guide vane stage of the gas turbine shown in FIG. 1, in which a baffle plate is not illustrated.

The gas turbine 1 shown in FIG. 1 comprises a combustion chamber 3, which is lined with heat-shielding elements 2, and a gas turbine 6 which is arranged downstream of the combustion chamber 3 and comprises guide vanes 4 and moving vanes 5. Said heat-shielding elements 2, which are held on the outer side of a positionally fixed supporting structure 7, 8 directly upstream of the gas turbine 6 in the downward flow direction, and vane platforms 11 of the guide vanes 4 of the first guide vane stage, which vane platforms are held, on the one hand, on the positionally fixed supporting structure 7 and, on the other hand, on a further positionally fixed supporting structure 10, define annular gaps 12 between them. Cooling-air openings 13 which are formed firstly on the end sides of the heat-shielding elements 2, extend substantially in the axial direction A, are distributed uniformly over the circumference of the annular gaps 12 in the circumferential direction U and obtain cooling air via cooling-air supply ducts 14, 15 open into the annular gaps 12. During the operation of the gas turbine 1, the annular gap 12 is cooled via said cooling-air openings 13 with cooling air which was used previously for cooling the heat-shielding elements 2. Secondly, cooling-air ducts 17 extending from the corresponding cooling-air supply duct 14, 15 through the supporting structures 7 and 8 open into regions of the annular gaps 12 that are arranged radially (direction R) with respect to leading edges 16 of the guide vanes 4. Said cooling-air ducts 17 serve to prevent hot gas from entering the annular gaps 12 due to an inhomogeneous pressure distribution in the region of the annular gap 12. Said inhomogeneous pressure distribution is caused by the hot gas on entering the gas turbine 6 accumulating at the leading edges 16 of the guide vanes 4 of the first guide vane stage, as a result of which pressure maxima are produced in the region of the leading edges 16, due to which the hot gas is pushed into the annular gaps 12. The cooling-air flows which are introduced through the cooling-air ducts 17 into the annular gaps 12 at positions which are positioned radially with respect to the respective leading edges 16 effectively counteract said pressure maxima. The vane platforms 11 of the guide vane 4 that is illustrated in FIG. 3 and is one of a plurality of identically designed guide vanes 4 of the first guide vane stage, said vane platforms 11 being U-shaped in cross section here and receiving the blade 18 between them are provided with a multiplicity of film-cooling holes 19 on the surfaces facing in the radial direction R. Baffle plates 20, which are not illustrated in FIG. 3 and are provided with through holes, are fastened to the radially outwardly facing surfaces of the vane platforms 11, said baffle plates 20 being designed and arranged in such a manner that the cooling air coming from the cooling-air supply ducts 14, 15 has to pass through them in order to reach the film-cooling holes 19, wherein there is in each case an intermediate space 21 between a baffle plate 20 and the film-cooling holes 19 of a blade platform 11.

Figure 4:
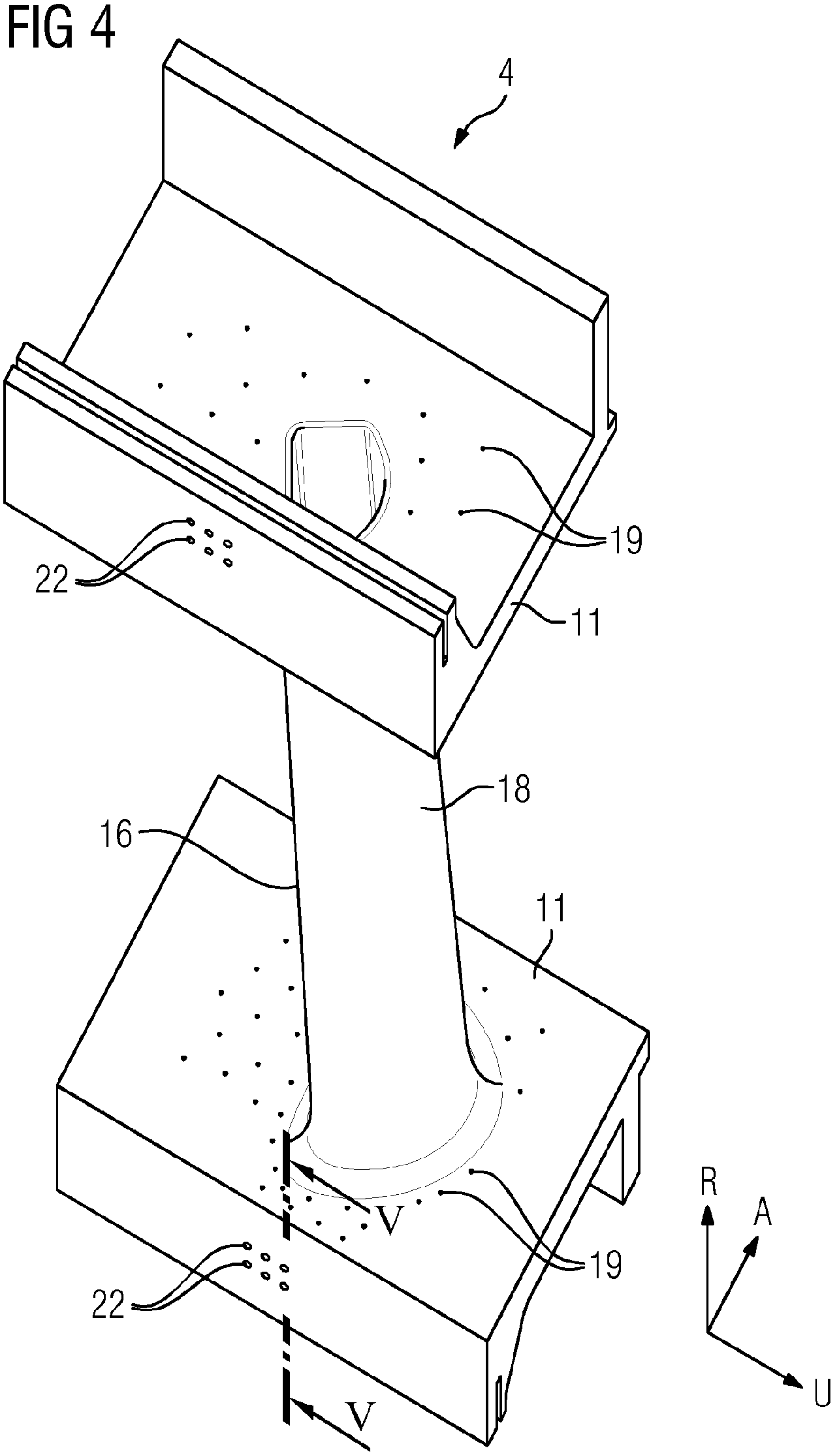
FIG. 4 shows a perspective view of a new or reconditioned guide vane, in which a baffle plate is not illustrated.
Figure 5:
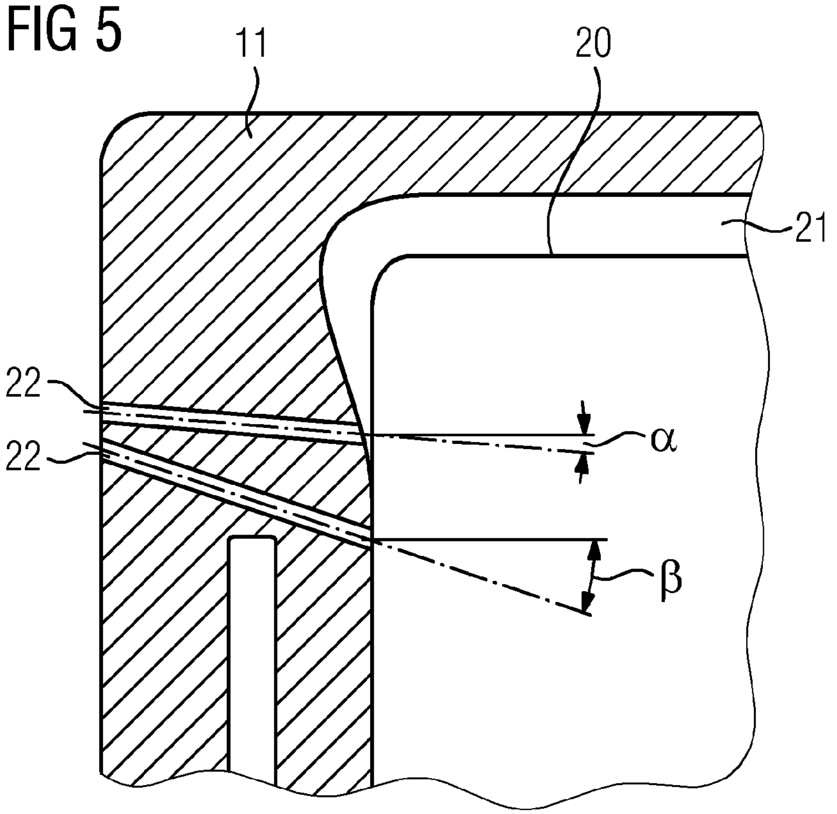
FIG. 5 shows a sectional view along the intercepting plane V in FIG. 4.

If, within the scope of an upgrading method according to the invention, the intention is, for example, to reduce the number of guide vanes 4 of the first guide vane stage, the guide vanes 4 have to be exchanged. For this purpose, in a first step, all the guide vanes 4 of the first guide vane stage are removed. In a further step, the removed guide vanes 4 of the first guide vane stage are replaced by new guide vanes 4. A problem which is associated with the fact that fewer new guide vanes 4 are installed than were previously fitted now consists in that the positions of the leading edges 16 of the guide vanes 4 and therefore the positions of the pressure maxima of the inhomogeneous pressure distribution are changed. Therefore, the cooling-air ducts 17 extending through the supporting structures 7, 8 likewise no longer open at the correct positions in order to be able to effectively counteract hot gas penetrating the annular gaps 12 in the region of the leading edges 16 of the guide vanes 4. To solve this problem, the vane platforms 11 of the new guide vanes 4, of which one is illustrated in FIGS. 4 and 5, are provided with cooling-air bores 22 which fluidically connect the cooling-air supply duct 14, 15 to the annular gaps 12 and open into the annular gaps 12. Said cooling-air bores 22 are arranged in such a manner that more cooling-air bores 22 open into regions of the annular gaps 12 that are arranged radially with respect to the leading edges 16 of the guide vanes 4 than into other regions of the annular gaps 12. Said cooling-air bores 22 therefore take on the function of the cooling-air ducts 17. In the present case, six cooling-air bores 22 are provided on each vane platform 11. Three of the cooling-air bores 22, which here enclose an angle α of between 5° and 10° with the axial direction A, open into the intermediate space 21 which is present between the vane platform 11 and the baffle plate 20, i.e. downstream of the baffle plate 20 in the direction of flow of cooling air. The other three cooling-air bores 22 here enclose an angle β in the range between 15° and 28° with the axial direction and open upstream of the baffle plate 20 in the direction of flow of cooling air. In principle, the angles α and β can have values in the range between 0° and 30° depending on the design of the guide vanes. Furthermore, the new guide vanes 4 are provided with film-cooling holes 19, but the number thereof is smaller than the number of film-cooling holes 19 of the removed guide vanes 4. In the present case, the new guide vanes 4 have fewer film-cooling holes 19 than the old guide vanes 4, as is apparent from the comparison of FIGS. 3 and 4. This has the advantage that some of the cooling air used previously for film cooling is now available for cooling the annular gaps 12, and therefore the overall cooling-air flow is not impaired because of the additional cooling-air bores 22. The cooling-air ducts 17 extending through the supporting structures 7 and 8 can be retained. Alternatively, however, they may also be closed before the installation of the new guide vanes 4.

A substantial advantage which is associated with the design of the new guide vanes 4 consists in that no new cooling-air ducts 17 have to be introduced into the supporting structures 7, 8 in order to adapt the cooling-air supply into the annular gaps 12 to the changing positions of the leading edges 16 of the guide vanes 4 and therefore of the pressure maxima. Accordingly, no machining operations have to be carried out in situ or on components of the gas turbine 1 which are difficult to remove. On the contrary, the cooling-air bores 22 can be produced directly during the production of the new guide vanes 4.

Figure 6:
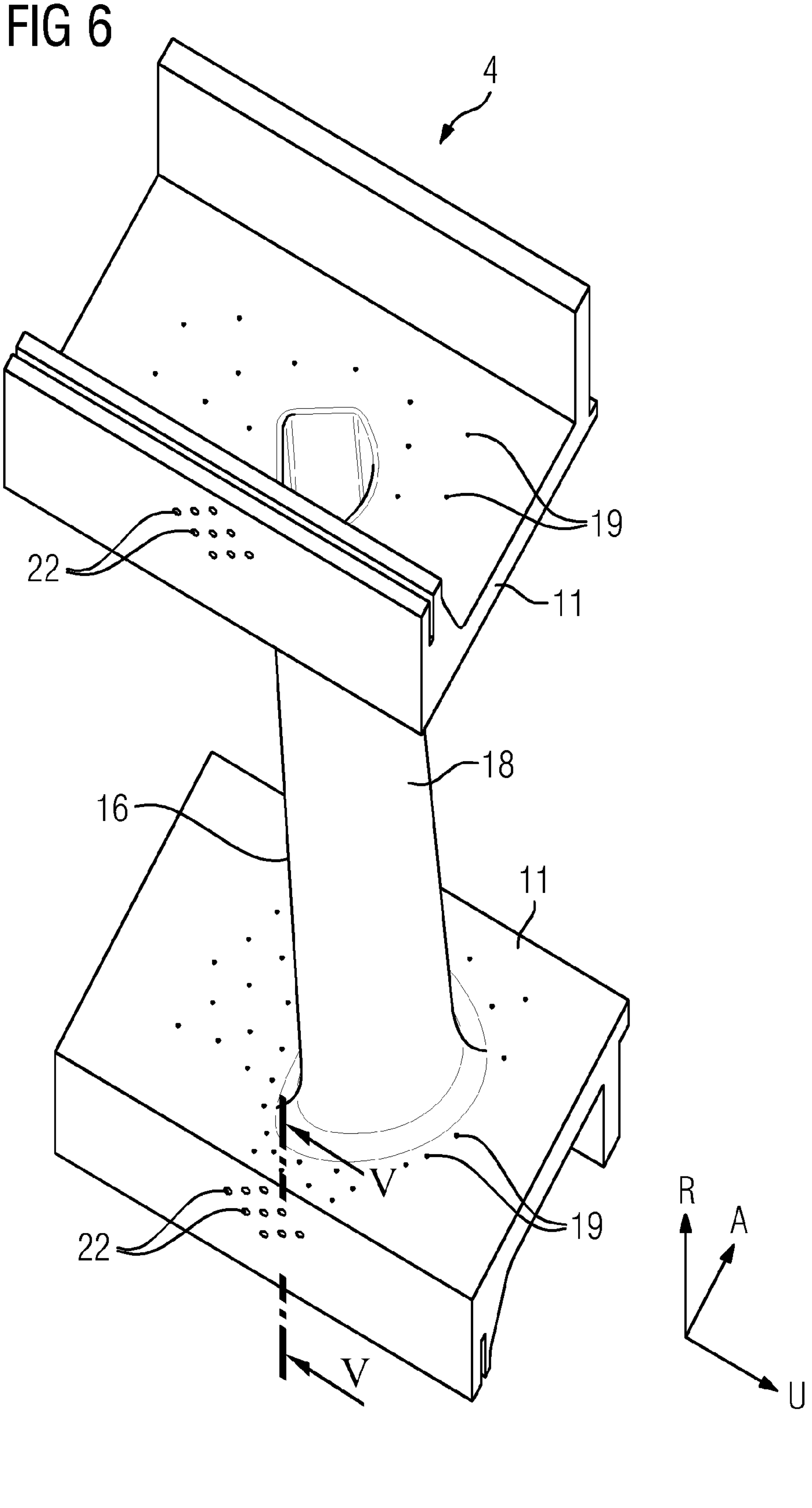
FIG. 6 shows a view analogously to FIG. 4, which shows a new or reconditioned guide vane with alternative patterns of cooling-air bores.

It should be pointed out that the previously described method can also be carried out in the case of such gas turbines 1 which do not have any cooling-air ducts 17 counteracting a penetration of hot gas into the annular gaps 12 in the region of the leading edges 16 of the guide vanes 4. Accordingly, the installation of the new guide vanes 4 for the first time provides a corresponding countermeasure against penetrating hot air due to inhomogeneous pressure distribution, specifically irrespective of whether the number of new or reconditioned guide vanes 4 is smaller than, equal to or greater than the number of existing guide vanes 4 of the gas turbine 1 to be upgraded. Furthermore, it should be clear that the positions, the orientations and the number of cooling-air bores 22 of the new guide vanes 4 may vary. FIG. 6 shows by way of example an alternative pattern of cooling-air bores 22 opening into an annular gap 12 radially from a leading edge 16. In addition, it should be pointed out that the new or reconditioned guide vanes 4 can also be provided with cooling-air bores 22 only on one of their vane platforms 11, and therefore cooling air is conducted by the guide vanes 4 only into one of the two annular gaps 12.

Although the invention has been illustrated and described in detail specifically by the exemplary embodiment, the invention is not restricted by the disclosed examples and a person skilled in the art can derive other variations therefrom without departing from the scope of protection of the invention.

The invention claimed is:

1. A method for upgrading a gas turbine arrangement which has a combustion chamber, which is lined with heat-shielding elements, and a gas turbine which is arranged downstream of the combustion chamber and comprises guide vanes and moving vanes, wherein said heat-shielding elements, which are held on an outer side of a positionally fixed supporting structure directly upstream of the gas turbine in a downward flow direction, and vane platforms of the guide vanes of a first guide vane stage, which vane platforms are held on a positionally fixed supporting structure, define annular gaps between them, the method comprising:

a) removing all the guide vanes of the first guide vane stage;

b) replacing the removed guide vanes of the first guide vane stage with new or reconditioned guide vanes, wherein vane platforms of the new or reconditioned guide vanes are provided with cooling-air bores which fluidically connect a cooling-air supply duct, which supplies the guide vanes of the first guide vane stage with cooling air, to one of the annular gaps and open into a corresponding annular gap, wherein the cooling-air bores are arranged in such a manner that more cooling-air bores open into regions of the annular gap or of the annular gaps that are arranged in a radial direction in a region of leading edges of the guide vanes than into other regions of the annular gap or of the annular gaps, wherein radially facing surfaces of the vane platforms of the guide vanes removed in step a) are provided with film-cooling holes which, in an installed state of the guide vanes, are fluidically connected to one of the cooling-air supply ducts, wherein radially facing surfaces of the vane platforms of the new guide vanes installed in step b) are provided with film-cooling holes which, in the installed state of the guide vanes, are fluidically connected to one of the cooling-air supply ducts, and wherein a number of film-cooling holes of the new or reconditioned guide vanes is smaller than a number of film-cooling holes of the guide vanes removed in step a).

2. The method as claimed in claim 1, wherein the cooling-air bores formed in vane platforms of the new or reconditioned guide vanes define cooling-air-bore groups which are arranged circumferentially at a distance from one another.

3. The method as claimed in claim 2, wherein the cooling-air bores of each cooling-air-bore group are positioned identically.

4. The method as claimed in claim 1, wherein baffle plates are arranged on vane platforms of the new or reconditioned guide vanes.

5. The method as claimed in claim 4, wherein each of the baffle plates is designed and arranged in such a manner that an intermediate space remains between it and the film-cooling holes.

6. The method as claimed in claim 5, wherein some of the cooling-air bores formed in the vane platforms of the new or reconditioned guide vanes are arranged in such a manner that they open into the intermediate space.

7. A method for upgrading a gas turbine arrangement which has a combustion chamber, which is lined with heat-shielding elements, and a gas turbine which is arranged downstream of the combustion chamber and comprises guide vanes and moving vanes, wherein said heat-shielding elements, which are held on an outer side of a positionally fixed supporting structure directly upstream of the gas turbine in a downward flow direction, and vane platforms of the guide vanes of a first guide vane stage, which vane platforms are held on a positionally fixed supporting structure, define annular gaps between them, the method comprising:

a) removing all the guide vanes of the first guide vane stage;

b) replacing the removed guide vanes of the first guide vane stage with new or reconditioned guide vanes, wherein vane platforms of the new or reconditioned guide vanes are provided with cooling-air bores which fluidically connect a cooling-air supply duct, which supplies the guide vanes of the first guide vane stage with cooling air, to one of the annular gaps and open into a corresponding annular gap, wherein the cooling-air bores are arranged in such a manner that more cooling-air bores open into regions of the annular gap or of the annular gaps that are arranged in a radial direction in a region of leading edges of the guide vanes than into other regions of the annular gap or of the annular gaps, and wherein the gas turbine arrangement which is to be modernized has cooling-air ducts which extend through the supporting structure, in each case fluidically connect one of the cooling-air supply ducts to one of the annular gaps and open into the corresponding annular gap, wherein a number of the new or reconditioned guide vanes does not correspond to a number of removed guide vanes, and wherein the cooling-air ducts extending through the supporting structure are at least partially closed after step a) is carried out and before step b) is carried out.

* * * * *